Oct. 11, 1966 K. D. CURRY 3,277,944
CUTTING HEADS AND SHARPENERS FOR TIRE TREAD CUTTING MACHINES
Filed Aug. 11, 1964 2 Sheets-Sheet 1

INVENTOR.
KENNETH D. CURRY,
BY
Linton and Linton
ATTORNEYS.

Oct. 11, 1966 K. D. CURRY 3,277,944
CUTTING HEADS AND SHARPENERS FOR TIRE TREAD CUTTING MACHINES
Filed Aug. 11, 1964 2 Sheets-Sheet 2
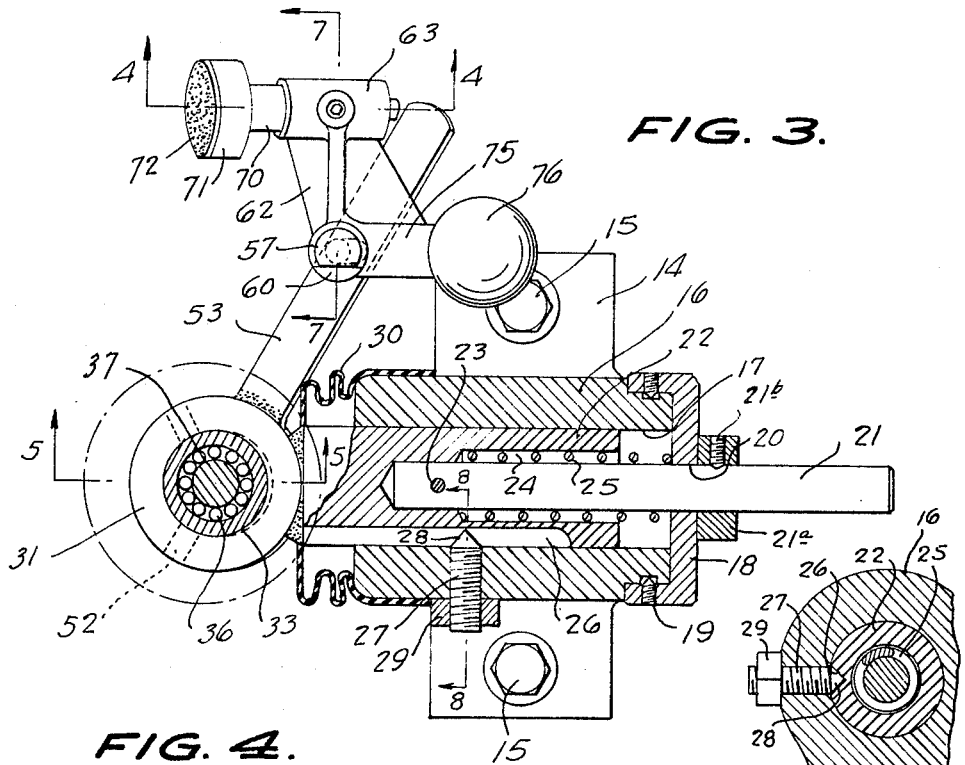
FIG. 3.
FIG. 4.
FIG. 5.
FIG. 8.
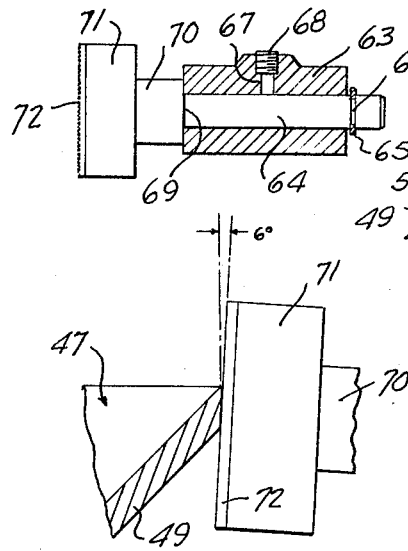
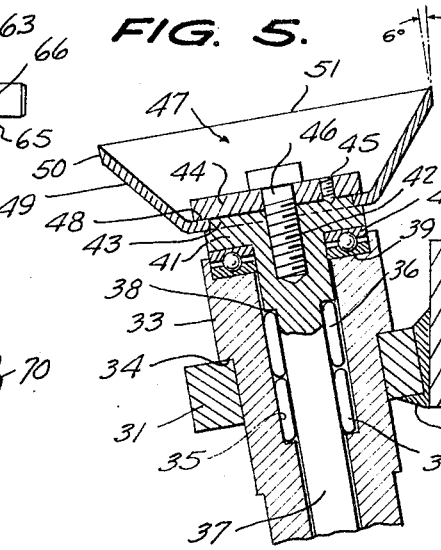
FIG. 6.
INVENTOR.
KENNETH D. CURRY,
BY
ATTORNEYS.

United States Patent Office 3,277,944
Patented Oct. 11, 1966

3,277,944
CUTTING HEADS AND SHARPENERS FOR TIRE TREAD CUTTING MACHINES
Kenneth D. Curry, 211 Arlington Loop,
Hattiesburg, Miss.
Filed Aug. 11, 1964, Ser. No. 388,852
3 Claims. (Cl. 157—13)

The present invention is directed to tire tread cutting machines and is more particularly concerned with an improvement in the cutter head assembly of such machines.

It is the principal object of the present invention to provide an improved cutter head with cutter sharpener for use with machines for removing high portions of a pneumatic vehicle tire tread such as shown in my Patent No. 2,925,125, dated February 16, 1960.

A further and important object of the invention is to provide a cutter head which will efficiently and accurately remove high portions of the tread rubber from tires to bring the tire tread into an even circular contour and which cutter head includes a cylindrical cup shaped rotary cutter having an annular shaped cutting edge which extends on a 6 degree angle from the axis of said cutter providing a smoother finish to the tire tread cut thereby.

Another and important object of the invention is to provide a cutter head having a slideable support for the cutter which maintains the cutter in a vertical position during the sliding of said support to prevent any rocking of the cutter when cutting the tire particularly at the edges of the tire tread.

An equally important object of the present invention is to provide a cutter head for trimming tire treads, having a rotatably driven cup shaped cutter with an annular shaped cutting edge which cutting edge can be sharpened and kept at the proper angle by a sharpener therefor carried by the cutter head and which cutting edge can be maintained down to the base of said cutter as the cutter is worn through use and sharpening of said cutting edge.

Another important object of the invention is to provide a tire tread cutting head assembly including a sharpener which sharpener can be manually moved laterally along the cutting edge of the cutter of said assembly to effect an even and fine honing of said cutting edge and which sharpener includes means for retaining the same away from said cutter when desired, but which means can be quickly and easily released without tools to permit said sharpener to engage said cutter at times for sharpening purposes.

Further objects of the invention will be in part obvious and in part pointed out in the following detailed description of the accompanying drawings, in which:

FIG. 3 is a cross-sectional view taken on line 3—3 of FIG. 2, but of the same size as FIG. 1.

FIG. 4 is a side elevation partly in section taken on line 4—4 of FIG. 3.

FIG. 5 is a cross-sectional view taken on line 5—5 of FIG. 3.

FIG. 6 is an enlarged view of the sharpener head engaging the cutting edge of the cutter which is partially shown and in cross-section.

FIG. 8 is a cross sectional view taken on line 8—8 of FIG. 3.

Figure 1:
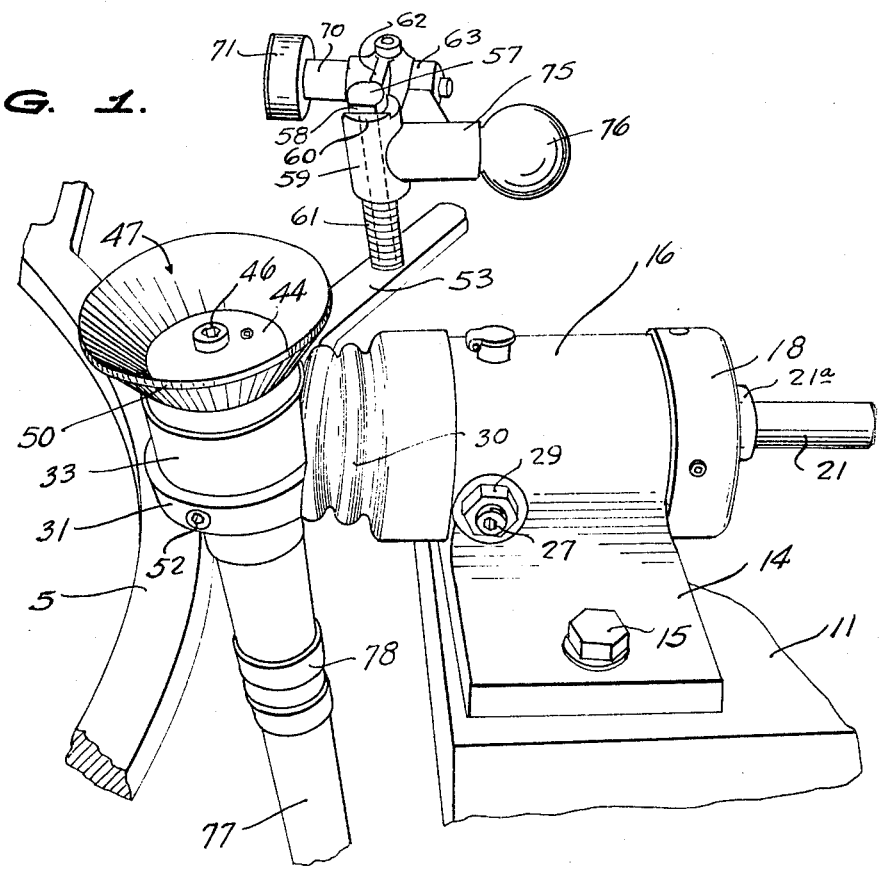
FIG. 1 is a perspective view of the present cutting head and sharpener assembly mounted on tire tread cutting machine, which is partially shown.

Referring now more particularly to the accompanying drawings wherein like and corresponding parts are designated by similar reference characters numeral 1 indicates one of the frame legs of a tire tread cutting machine such as shown in my aforementioned Patent No. 2,925,125, while 2 indicates an angular structural top side bar of said frame and 3 an angle bar slide slideably and adjustably positioned on bar 2. Block 4 fixedly mounted on said slide supports one end of a curved template 5 fastened thereon by a screw and nut 6. Said template varies in curvature dependent upon the cross-sectional contour of the tread surface B of the tire A rotatably supported on said frame.

A screw rod 7 controlled by hand wheel 8 is rotatably mounted on said frame, and in threaded engagement with nut 9 fixedly mounted on the bottom of cross-head 10 which has a dove-tail engagement with slide 11 slideably mounted thereon.

A nut 12 is fixedly mounted on slide 11 and is in threaded engagement with a screw rod 13.

The foregoing elements correspond to similar elements in the machine shown and described in my Patent No. 2,925,125.

A base 14 for the cutter head and sharpener assembly is fastened by bolts 15 to slide 11 and has a tubular head 16 integral therewith. Head 16 has a bore 17, one end of which is closed by cap 18 fastened to said head by set screws 19 and which cap has a center opening 20 through which slideably extends shaft 21.

A cylindrical piston 22 is slideably mounted in bore 17 and extends from the other end thereof. Pin 23 fixedly connects shaft 21 within said piston which has an axial recess 24 with coil spring 25 surrounding shaft 21, positioned in recess 24 and abutting cap 18 tending to move said piston away from said cap.

Piston 22 has a longitudinally extending peripheral groove 26 of a V-shaped cross-sectional configuration.

An Allen screw 27 with a cone-shape nylon tip 28 extends through head 16 into groove 26 and is in threaded engagement with said head. Lock nut 29 is also in threaded engagement with said screw.

A bellows-type flexible boot 30 encloses the extended end of piston 22 and the corresponding end portion of head 16. A ring 31 is welded at one side by weld 32 to the extended end of piston 22 and slants with the top face of said ring extending on an 11 degree angle from the axis of said piston.

A tubular cable cover 33 extends through ring 31 and has a shoulder 34 seated on said ring supporting said cover. Said cover has an internal annular recess 35 in which are positioned rollers 36 surrounding the flexible cable 37 extending lengthwise of said cover and connected to a motor (not shown) for being rotated thereby. Said cable also has a shoulder 38 seated upon the top rollers 36.

A thrust bearing 39 is seated in the end of cover 33 and supports the bottom face 40 of flange 41 forming the top end of cable 37. Said flange has an annular longitudinal extension 43 of a reduced diameter with plate 44 retained thereon by bolt 46 is threaded engagement with the axial threaded recess 42 in said cable. A set screw 45 retains said plate from rotation relative to extension 43.

The cutter 47 is of a truncated or cup shaped configuration having a flat base 48 positioned between flange 41 and plate 49 and with extension 43 extending into an opening in said base. Said cutter further has an annular side wall 49 diverging from its base and the free end of said wall is sharpened to form cutting edge 51.

Preferably said side wall 49 extends on an angle of 52 degrees from said base 48, while said cutting edge is formed by grinding the outer periphery of said side wall at the top free edge thereof on a flat 50 extending on an angle of 6 degrees away from the axis of said cutter providing a sharp annular cutting edge 51.

Screws 52 extend through ring 31 in threaded engagement therewith and against cover 32 to retain the same together.

An arm 53 is integral with or welded to ring 31 and extends laterally therefrom. A cylindrical rod 54 has a threaded end 55 of reduced diameter extending through arm 53 with nut 56 therebeneath in threaded engagement with end 55 retaining rod 54 normal to said arm. The opposite end 57 of said rod is annular and of a greater diameter than rod 54 except for flat wall 58.

A sleeve 59 is slideably mounted on rod 54 and has a flat inner walled longitudinal extension 60. A coil spring 61 surrounds rod 54 between arm 53 and sleeve 59. An arm 62 is integral at one end with and extends laterally from sleeve 59 and in turn has a sleeve 63 integral with its other end which sleeve 63 extends on a 6 degree angle above normal to sleeve 59.

A shaft 64 extends through sleeve 63 with a split lock ring 65 seated in a groove 66 one end portion of said shaft.

A threaded port 67 extends through sleeve 63 for admitting a lubricant and is closed by threaded plug 68 in threaded engagement therewith.

The opposite end of shaft 64 has a shoulder 69 provided by a portion 70 of greater diameter with sleeve 63 thus positioned between ring 65 and shoulder 60. Further shaft 64 has an annular disc 71 integral therewith to which is attached a commercially available grinding disc 72 by a suitable adhesive. For example, a disc 72 can be aluminum oxide coated.

Cover 33 can be rigid and of a metallic material while a flexible extension 77 thereof can be connected thereto by a coupling 78.

In the use of the present apparatus handle 8 is rotated moving cross-head 10 from leg 1 until cover 33 touches template 5.

Spring 25 will retain the cutting head 47 against the tire tread B while lateral translation of said cutting head across said tire tread is effected by reciprocating the head (not shown) of screw 13 and thus slide 11.

Figure 2:
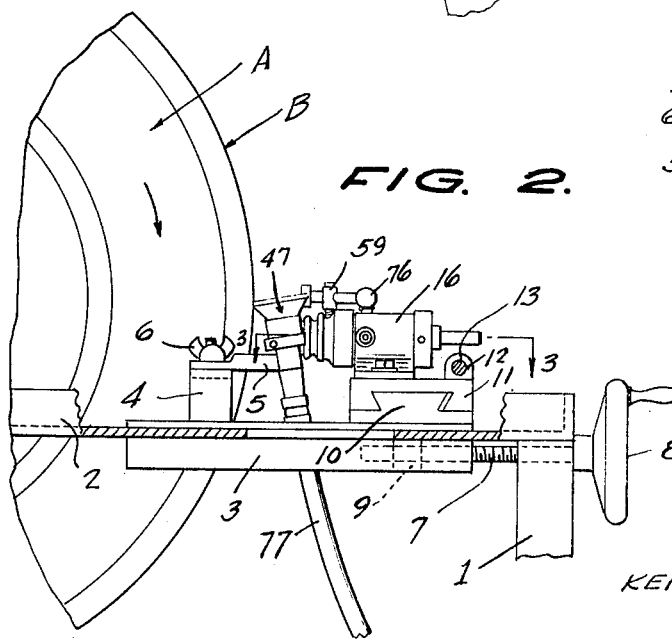
FIG. 2 is a reduced size cross-sectional view of a top portion of a tire tread cutting machine including an inflated wheel mounted pneumatic tire and the present cutter head and sharpener assembly.
Figure 7:
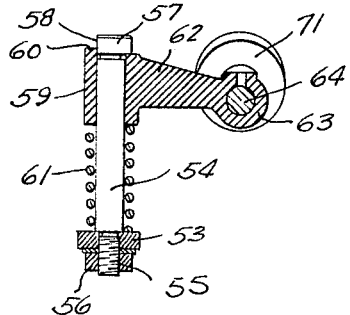
FIG. 7 is a cross-sectional view taken on line 7—7 of FIG. 3.

Tire A is mounted upon a wheel or the like and inflated, and is rotated in the direction of the arrow in FIG. 2, towards cutting edge 51 by means (not shown) while said cutter is rotated by shaft 37 whereupon said cutter will trim the tire tread B until a uniform tread surface has been obtained.

It has been found in practice that a flat 50 having an angle of 6 degrees from the axis of the cutter 47 provides the best angle of attack for the cutting edge 51 to obtain a smooth trimming of the tire tread without forming even small gouged out sections of tire.

To maintain this 6 degree angle of the flat 50, the operator can push knob 76 to pivot arm 75 integral with sleeve 59 and thus bring the abrasive disc 72 against flat 50 as shown in FIG. 6 and at the same time reciprocate sleeve 59 moving said disc 72 laterally of flat 50 varying the portion of disc 72 against said flat. This is carried out while cutter 47 is being rotated.

As cutter 47 wears due to the use thereof and repeated sharpening of the same, knob 76 can move sleeve 59 down shaft 54 and thus a flat 50 can be formed on said cutter until it is worn down to its base 43.

It is to be appreciated that shaft 54 is parallel to the axis of said cutter 47 or the relative angles of the elements can be arranged to assure that disc 72 has an angle of 6 degrees relative to the axis of said cutter.

Spring 61 tends to push sleeve 59 against head 47 and when wall 60 is parallel to wall 58, said spring will push wall 60 along wall 58 whereby sleeve 59 will be prevented from pivoting until it is pushed against spring 61 moving wall 60 below wall 58. As shown in FIGS. 1 and 3, wall 58 and wall 60 are positioned so that they are only parallel when disc 72 is withdrawn a distance from cutter 47.

Screw tip 28 is adjusted by movement of screw 27 when nut 29 is loosened so that the walls defining recess 26 are slidable longitudinally of said tip and then nut 29 is tightened on said screw. However, tip 28 prevents any lateral rotation of piston 22 retaining the axis of cutter 47 in a vertical plane.

A stop 21a has the outer end portion of shaft 21 extending therethrough and set screw 21b is in threaded engagement with said ring and extends therethrough against shaft 21 retaining said ring at any desired position along said shaft. Said ring thereby limits the movement of shaft 21 to the left of FIG. 3, when said ring abuts head 16 due to the action of spring 25 but permits said shaft to move to the right of said figure.

The present device is capable of considerable modification and such changes thereto as come within the scope of the appended claims are deemed to be a part of the present invention.

I claim:

1. A cutter head and sharpener assembly for tire tread cutting machines comprising an adjustably mounted tubular head, a spring pressed piston slideably mounted in said head, a rotatably driven cup shaped cutter rotatably connected to said piston, an abrasive disc, an arm fixedly connected to said piston, a shaft mounted on said arm, a sleeve rotatably and slideably mounted on said shaft, a pair of arms connected to and extending laterally of said sleeve, a second sleeve fixedly connected to one of said pair of arms, and a second shaft rotatably mounted in said second sleeve and having said abrasive detachably mounted on one end of said second shaft for movement of said abrasive disc to and from said cutter upon the pivoting of said first mentioned sleeve.

2. A cutter head and sharpener assembly for tire tread cutting machines as claimed in claim 1 wherein said second shaft supports said abrasive disc extending on a six degree angle relative to the axis of said cutter.

3. A cutter head and sharpener assembly for tire tread cutting machines comprising an adjustably mounted tubular head, a spring pressed piston slideably mounted in said head, a rotatably driven cup shaped cutter rotatably connected to said piston, an abrasive disc, an arm fixedly connected to said piston, a shaft mounted on said arm, a sleeve rotatably and sildeably mounted on said shaft, said shaft having a lateral annular flange of a larger diameter than the bore of said sleeve with a flat side, said sleeve having an extension with a flat side positioned for sliding onto said flange flat side at a certain relative position of said sleeve and said shaft, resilient means tending to push said sleeve against said flange and means connected to said sleeve supporting said abrasive disc for movement of said abrasive disc to and from said cutter upon the pivoting of said sleeve.

References Cited by the Examiner

UNITED STATES PATENTS

| | | | |
|---|---|---|---|
| 1,891,789 | 12/1932 | Wheeler | 157—13 |
| 2,167,017 | 7/1939 | Wikle | 157—13 |
| 2,868,291 | 1/1959 | McMahan | 157—13 |
| 2,925,125 | 2/1960 | Curry | 157—13 |
| 3,019,525 | 2/1962 | Bruecker | 30—43.6 |

GRANVILLE Y. CUSTER, JR., *Primary Examiner.*